United States Patent [19]

Multakh

[11] 4,211,294
[45] Jul. 8, 1980

[54] IMPREGNATED DIAMOND DRILL BIT

[75] Inventor: Leonid Multakh, Scranton, Pa.

[73] Assignee: Acker Drill Company, Inc., Clarks Summit, Pa.

[21] Appl. No.: 898,697

[22] Filed: Apr. 21, 1978

[51] Int. Cl.² ............................................. E21B 9/16
[52] U.S. Cl. ..................................... 175/330; 51/309
[58] Field of Search ................ 175/329, 330; 51/293, 51/309

[56] References Cited

U.S. PATENT DOCUMENTS

| | | | |
|---|---|---|---|
| 2,589,357 | 3/1952 | Fantozzi et al. | 51/309 |
| 2,607,676 | 8/1952 | Kurtz | 51/309 |
| 2,703,750 | 3/1955 | Cotter | 51/293 |
| 2,712,988 | 7/1955 | Kurtz | 51/309 |
| 2,833,638 | 5/1958 | Owen | 51/309 |
| 3,372,010 | 3/1968 | Parsons | 51/309 |
| 3,464,804 | 9/1969 | Kunatomi et al. | 51/293 |
| 3,879,901 | 4/1975 | Coveney | 51/309 |

*Primary Examiner*—James A. Leppink
*Attorney, Agent, or Firm*—LeBlanc, Nolan, Shur & Nies

[57] ABSTRACT

An impregnated diamond drill bit having a crown containing a plurality of diamond particles. The crown is formed from a fused powdered metallic matrix that includes titanium carbide and a nickel-manganese alloy. The diamond particles are dispersed within the metallic matrix which is then fused so as to hold the diamond particles in place. Although the mixture including the nickel-manganese solid solutions has a lower degree of hardness than that of prior impregnated diamond drill bits, the use of the nickel-manganese alloy improves the retention ability of the metallic matrix for securing the diamonds within the crown. A steel shank is attached to the crown.

9 Claims, 2 Drawing Figures

IMPREGNATED DIAMOND DRILL BIT

BACKGROUND OF THE INVENTION

The present invention relates to impregnated diamond drill bits.

In general, there are two basic types of diamond drill bits: surface set bits and impregnated drill bits. A surface set diamond drill bits has a plurality of diamond particles that are set on the surface of the metallic matrix. In the surface set bits, the diamonds are of such a size that there are approximately 30 to 40 diamond particles per carat. In the impregnated diamond drill bits, the diamond particles are physically mixed with the metallic powder so as to be dispersed in the powder. With the impregnated bits, very small grains of diamonds are used, on the order of 40 to 50 mesh in size, i.e. approximately 1,250 particles per carat. With both types of bits, the diamonds are arranged within the crown of the bit. A steel shank is then attached to the crown.

With the impregnated diamond drill bits, as the metal matrix wears away, new diamonds are exposed with such diamonds providing new cutting surfaces. Ideally, the diamonds should be evenly dispersed within the metal matrix so that as the matrix wears, there are always new diamond cutting surfaces being exposed.

In general, both the surface set bits and the impregnated bits are made by placing the diamond particles within a carbon mold along with the various components of the metal matrix. In the case of the surface set bits, the diamonds are first placed into the mold and then the remainder of the mold is filled with the metallic powder. In forming the impregnated bits, the diamond particles and the powder are mixed together and poured into a mold. In order to obtain better distribution of the diamonds, small quantities of the metallic powder and the diamond particles can be mixed and a plurality of such mixtures poured into the mold, a layer at a time, thereby obtaining a better distribution of the diamond particles. After the mold has been filled with the diamonds and the metallic powder so as to form the metal matrix, heat and pressure are applied and silver or another type of solder is provided to infiltrate the powdered metal matrix and effectively hold the diamonds in the powder matrix thereby forming the crown structure. The crown structure is then bonded to a steel shank thus completing the drill bit.

In accordance with the prior art, the composition of the powdered metal matrix used to hold the diamond particles has primarily consisted of titanium carbide and iron. Once fused, the titanium carbide provides a crown having a hardness in the range of approximately 20 to 25 Rockwell C. The iron powder that is employed in the matrix provides for good infiltration between the diamond particles, thereby improving the soldering, or fusing, process.

In accordance with the prior art, it has been necessary for the metal matrix to have a hardness within the range provided by the use of the titanium carbide in order to adequately hold the diamond particles. If a matrix having a lower degree hardness was used, the diamond particles were not adequately retained during employment of the impregnated diamond drill bit. Various metallic compositions for retaining diamond particles within a structure are disclosed by U.S. Pat. Nos.: 2,703,750 to Cotter; 3,464,804 to Kuratomi et al; and 3,879,901 to Caveney.

Although the titanium carbide matrix securely retained the diamond particles, the hardness of the crown structure caused several major disadvantages. Unfortunately, drill bits having such crown structures are too hard for use in many rock formations. A crown structure having a hardness of between 20 to 25 Rockwell C is so abrasive resistent that as the bit is used the matrix does not wear away so as to expose new diamond cutting edges. As a result, the cutting rate of the impregnated diamond drill bit is impeded and the effective life of the bit is significantly diminished.

SUMMARY OF THE PRESENT INVENTION

Object of the present invention is to provide an improved diamond drill bit that has superior capabilities of securely retaining the diamond particles as compared to those drill bits of the prior art.

Another object of the present invention is to provide an impregnated diamond drill bit having a crown structure with a hardness of less than 20 Rockwell C which still is capable of securely retaining the diamond particles.

A further object of the present invention is to provide a powdered metal matrix having a new composition for forming the crown structure of an impregnated diamond drill bit which matrix has a lower degree of hardness but still securely retains the diamond particles.

It has been found that all these objectives can be achieved by the employment of a newly developed metal mixture for the powdered metal matrix used for the crown structure of the impregnated diamond drill bits. By employing a mixture of titanium carbide and nickel manganese as a composition of the powdered metal matrix, it is possible to form a crown structure which is much softer than the structures of the prior art but still securely holds the diamond particles in place.

In accordance with one preferred embodiment of the present invention, the metallic mixture contains up to 50% titanium carbide and 30% nickel manganese along with 20% of iron powder. The resulting crown structure has a hardness of no greater than 10 Rockwell C. The resulting crown, however, provides a diamond retention ability of the same mangitude as that provided by the crowns formed in accordance with the prior art compositions that have a hardness within a range of 20 to 25 Rockwell C. Such a crown structure is capable of more easily wearing away so as to expose new diamond cutting edges while simultaneously preventing the diamonds from working themselves loose from the structure.

Although in accordance with the preferred embodiment, nickel manganese is used in combination with the titanium carbide, it is possible for other alloys to be employed. The alloy selected must be capable of wetting the surface of the diamond particles. Such alloys typically have a relatively low melting temperature. When using such alloys within the powdered metal matrix, upon applying heat, the alloys prepares the surfaces of the diamond particles so that the surfaces have a greater affinity for the matrix material. Once the surfaces of the diamond particles have so prepared, upon solidifying the metal matrix securely retains the diamond particles.

The amounts of titanium carbide and nickel manganese alloy used in the mixture vary depending upon the particular use intended for the drill bit. Since the titanium carbide is more abrasive and provides for a higher degree of hardness, a greater quantity of that compound is used for more abrasive rock formations. On the other hand, where the drill is to be used in softer rock formations, a greater quantity of the nickel-manganese alloy can be employed.

In general, a powdered metal matrix includes between 15% to 50% by weight of a metal alloy having a relatively low melting temperature and capable of properly preparing the surface of the diamond particles (in the preferred embodiment the nickel-manganese alloy), 10% to 50% titanium carbide and 20% to 50% iron powder. In general, the iron powder is employed since it has good infiltration characteristics and serves to improve the soldering or fusing characteristics of the powdered metal matrix. Where a nickel-manganese alloy is used, the alloy should be formed from a mixture of approximately 50% to 60% nickel and 40% to 50% manganese.

An impregnated diamond drill bit made in accordance with the present invention, one that has a crown structure that is made from a powdered metal matrix containing an appropriate metal alloy such as nickel-manganese alloy, has vastly superior wearing characteristics than previously used drill bits. Since the crown structure has a lower degree of hardness, the structure is more easily worn away as the bit is used thereby exposing new diamond cutting surfaces. For this reason, it is possible to operate the drill bit at higher speeds, since new cutting surfaces are more rapidly exposed. Furthermore, the drill bit will last for a significantly longer period of time than prior drill bits. With respect to the expected lifetime, it is possible for the lifetime to be increased by a factor of two or three times the expected life span of prior drill bits.

DESCRIPTION OF THE PREFERRED EMBODIMENTS

Figure 1:
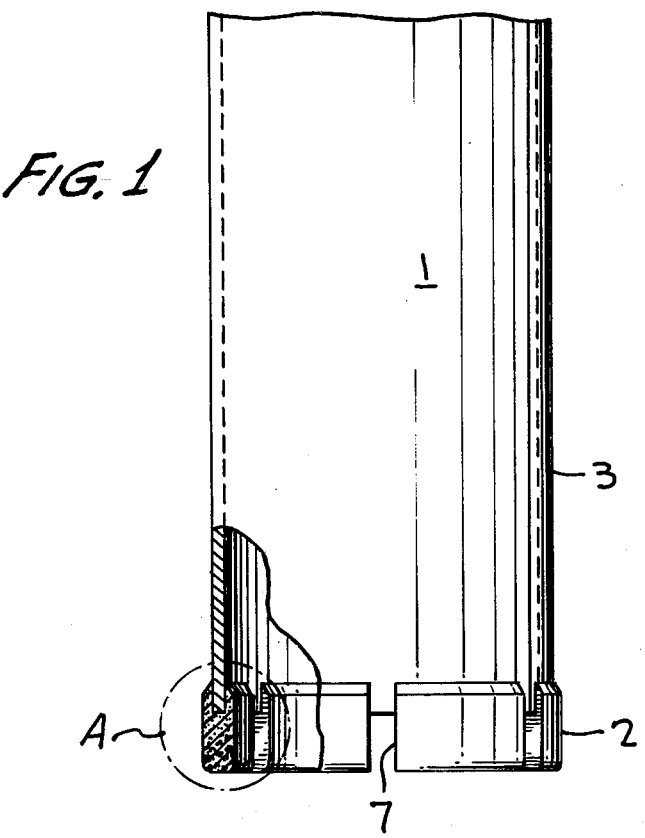
FIG. 1 is a side view of a portion of an impregnated drill bit in accordance with the present invention with a portion of the bit being cut away.

FIG. 1 illustrates an embodiment of an impregnated diamond drill bit 1. Drill bit 1 has a crown 2 mounted on a steel shank 3. Openings 7 within the crown structure serve as water channels that enable water to flow across the drill bit for carrying away the cuttings from the drilling operation.

Figure 2:
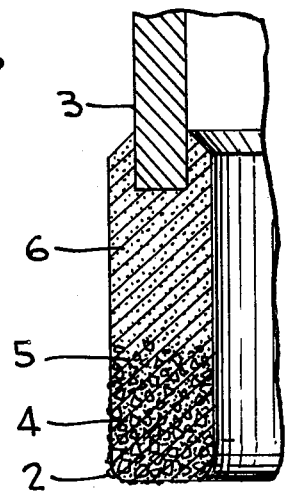
FIG. 2 is an enlarged view of Section A of the drill bit illustrated in FIG. 1.

As shown in FIG. 2, a plurality of diamond particles 4 are contained in the lower end of crown 2. The diamond particles are distributed, as evenly as possible, within a powdered metal matrix 5. Above the mixture of diamond particles and the metal matrix, there is a joint filler 6 that completes the crown structure. The joint filler is the same as that normally used in attaching the steel shank to the crown structure in both surface set and impregnated diamond drill bits.

In accordance with the preferred embodiment, the powdered metal matrix is formed from a mixture of titanium carbide, a nickel manganese alloy and iron powder. In general, the mixture contains approximately 10% to 50% by weight of the titanium carbide, 15% to 50% of the nickel manganese alloy and 20% to 50% of the iron powder. The nickel manganese alloy is formed from a mixture of approximately 50% to 60% nickel and 40% to 50% manganese. The actual quantity of each component used in the mixture depends upon the intended use for the drill bit being formed. Thus, the more abrasive resistent the rock formation in which the drill bit is intended to be used, the greater the quantity of titanium carbide employed within the mixture.

Two examples of the content of the powdered metal matrix for two different types of drill bits are shown below:

| Drilling Use | Titanium Carbide | Nickel Manganese | Iron |
|---|---|---|---|
| Reinforced concrete | 25% | 50% | 25% |
| Granite | 20% | 30% | 50% |

It is noted that the above description and the accompanying drawings are provided merely to present exemplary embodiments of the present invention and that additional modifications of such embodiments are possible within the scope of this invention without deviating from the spirit thereof.

I claim:

1. An impregnated diamond drill bit comprising: a crown containing diamond particles dispersed within a fused metallic matrix having a hardness of no greater than 10 Rockwell C and containing a metal alloy having a relatively low melting temperature and capable of preparing the surfaces of the diamond particles so that said surfaces have a greater affinity for the metallic matrix and a metal shank attached to said crown, said metal alloy being formed essentially of nickel and manganese so as to give a nickel-manganese alloy.

2. An impregnated diamond drill bit comprising: a crown formed of a fused metallic matrix having a hardness of less than approximately 20 Rockwell C, said metal matrix containing between 15% and 50% of a metal alloy, said alloy being formed essentially of nickel and manganese so as to give a nickel-manganese alloy, said metal alloy being capable of preparing the surfaces of the diamond particles so that said surfaces have a greater affinity for the metallic matrix, said crown having a plurality of diamond particles dispersed within said fused metallic matrix and a shank member attached to said crown.

3. An impregnated diamond drill bit as defined in claim 1 wherein said metal alloy is a nickel-manganese alloy.

4. An impregnated diamond drill bit as defined in claim 1 wherein said metal alloy acts to securely retain said diamond particles within said fused metallic matrix.

5. An impregnated diamond drill bit as defined in claim 1 or 2 wherein said metallic matrix includes a mixture of titanium carbide, iron and said metal alloy.

6. An impregnated diamond drill bit as defined in claim 5 wherein said fused metallic matrix has a hardness of approximately 10 Rockwell C.

7. An impregnated diamond drill bit as defined in claim 5 wherein said fused metallic matrix is formed from a mixture including 15% to 50% by weight of nickel-manganese alloy, 10% to 50% titanium carbide and 20% to 50% iron.

8. An impregnated diamond drill bit as defined in claim 7 wherein said nickel-manganese alloy is formed from a mixture of 50% to 60% nickel and 40% to 50% manganese.

9. An impregnated diamond drill bit as defined in claim 8 wherein a majority of said diamond particles are approximately between 40 to 50 mesh in size.

* * * * *

UNITED STATES PATENT AND TRADEMARK OFFICE
CERTIFICATE OF CORRECTION

PATENT NO. : 4,211,294
DATED : July 8, 1980
INVENTOR(S) : Leonid Multakh

It is certified that error appears in the above—identified patent and that said Letters Patent are hereby corrected as shown below:

Claim 4, line 48, "claim 1" should read --claim 1 or 2--.

Signed and Sealed this

Twenty-eighth Day of October 1980

[SEAL]

Attest:

SIDNEY A. DIAMOND

Attesting Officer

Commissioner of Patents and Trademarks